US009635624B2

United States Patent
Xu et al.

(10) Patent No.: US 9,635,624 B2
(45) Date of Patent: Apr. 25, 2017

(54) DISCOVERY REFERENCE SIGNAL DESIGN FOR COORDINATED MULTIPOINT OPERATIONS IN HETEROGENEOUS NETWORKS

(75) Inventors: Hao Xu, San Diego, CA (US); Xiliang Luo, Cardiff, CA (US); Peter Gaal, San Diego, CA (US); Tingfang Ji, San Diego, CA (US); Kapil Bhattad, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 878 days.

(21) Appl. No.: 13/401,660

(22) Filed: Feb. 21, 2012

(65) Prior Publication Data

US 2012/0213109 A1  Aug. 23, 2012

Related U.S. Application Data

(60) Provisional application No. 61/445,420, filed on Feb. 22, 2011.

(51) Int. Cl.
*H04W 52/40* (2009.01)
*H04B 7/024* (2017.01)
(Continued)

(52) U.S. Cl.
CPC ............ *H04W 52/40* (2013.01); *H04B 7/024* (2013.01); *H04W 52/50* (2013.01); *H04L 5/0048* (2013.01);
(Continued)

(58) Field of Classification Search
CPC ... H04W 52/242; H04W 52/40; H04W 52/50; H04B 7/024
(Continued)

(56) References Cited

U.S. PATENT DOCUMENTS

2007/0010270 A1*  1/2007  Dillon ........................... 455/513
2007/0197252 A1   8/2007  Watanabe et al.
(Continued)

FOREIGN PATENT DOCUMENTS

CN   1871871 A   11/2006
GB   2407454 A    4/2005
(Continued)

OTHER PUBLICATIONS

3GPP TSG RAN WG1 Meeting #64 R1-111000.*
(Continued)

*Primary Examiner* — Khaled Kassim
*Assistant Examiner* — Syed S Ali
(74) *Attorney, Agent, or Firm* — Patterson & Sheridan, L.L.P.

(57) ABSTRACT

Certain aspects of the present disclosure relate to techniques that may be used to discover transmission points in heterogeneous networks (HetNet) that involves coordinated multipoint (CoMP) transmission and reception. Certain aspects of the present disclosure provide a method for wireless communications by a user equipment (UE). The method generally includes receiving a configuration indicating distinct resources used by each of a plurality of different transmission points involved in coordinated multipoint (CoMP) operations with the UE for transmitting discovery reference signals (RSs), receiving distinct discovery RSs transmitted from the plurality of different transmission points, and calculating at least one of path loss or reference signal received power (RSRP) estimations for each of the transmission points based on the distinct discovery RSs.

36 Claims, 15 Drawing Sheets

(51) Int. Cl.
*H04W 52/50* (2009.01)
*H04W 52/24* (2009.01)
*H04L 5/00* (2006.01)

(52) U.S. Cl.
CPC ........ *H04W 52/242* (2013.01); *H04W 52/244* (2013.01)

(58) Field of Classification Search
USPC .......................................................... 370/252
See application file for complete search history.

(56) References Cited

U.S. PATENT DOCUMENTS

| | | | |
|---|---|---|---|
| 2008/0267126 A1 | 10/2008 | Vujcic et al. | |
| 2008/0268893 A1 | 10/2008 | Lee et al. | |
| 2008/0279257 A1* | 11/2008 | Vujcic | H04B 7/2637 375/132 |
| 2009/0290550 A1* | 11/2009 | Bhattad et al. | 370/329 |
| 2010/0208603 A1* | 8/2010 | Ishii | 370/252 |
| 2010/0296467 A1 | 11/2010 | Pelletier et al. | |
| 2010/0309797 A1* | 12/2010 | Lindoff et al. | 370/252 |
| 2011/0039499 A1 | 2/2011 | Zhang et al. | |
| 2011/0243007 A1 | 10/2011 | Xiao | |
| 2011/0255514 A1* | 10/2011 | Olofsson et al. | 370/331 |
| 2011/0317581 A1* | 12/2011 | Hoshino | H04L 1/0026 370/252 |
| 2012/0087322 A1* | 4/2012 | Anderson et al. | 370/329 |
| 2012/0120842 A1* | 5/2012 | Kim | H04B 7/024 370/252 |
| 2012/0120903 A1* | 5/2012 | Kim | H04B 7/024 370/329 |
| 2012/0307660 A1* | 12/2012 | Lindoff | H04W 24/10 370/252 |
| 2012/0315890 A1* | 12/2012 | Suzuki et al. | 455/422.1 |
| 2013/0005388 A1* | 1/2013 | Naka et al. | 455/522 |
| 2013/0033999 A1* | 2/2013 | Siomina et al. | 370/252 |
| 2013/0035132 A1* | 2/2013 | Shin et al. | 455/522 |
| 2013/0039203 A1* | 2/2013 | Fong | H04B 7/024 370/252 |
| 2013/0083681 A1* | 4/2013 | Ebrahimi Tazeh Mahalleh | H04L 5/0057 370/252 |
| 2013/0121279 A1* | 5/2013 | Noh et al. | 370/329 |
| 2013/0156001 A1* | 6/2013 | Gomadam | H04W 72/0406 370/330 |
| 2013/0156015 A1* | 6/2013 | Abe et al. | 370/336 |
| 2013/0176978 A1* | 7/2013 | Abe et al. | 370/329 |
| 2013/0195063 A1* | 8/2013 | Ahn et al. | 370/329 |
| 2013/0258950 A1* | 10/2013 | Behroozi et al. | 370/328 |
| 2013/0265901 A1* | 10/2013 | Pedersen et al. | 370/252 |
| 2013/0294371 A1* | 11/2013 | Ishii et al. | 370/329 |
| 2013/0301422 A1* | 11/2013 | Caretti | H04B 1/1027 370/241 |
| 2013/0310077 A1* | 11/2013 | Siomina et al. | 455/456.2 |
| 2013/0310100 A1* | 11/2013 | Lee | H04B 7/024 455/517 |
| 2014/0011507 A1* | 1/2014 | Bhattad et al. | 455/450 |
| 2014/0043996 A1* | 2/2014 | Terry et al. | 370/252 |
| 2014/0044052 A1* | 2/2014 | Gaal et al. | 370/328 |
| 2014/0086182 A1* | 3/2014 | Shin et al. | 370/329 |
| 2014/0133336 A1* | 5/2014 | Park | H04W 24/10 370/252 |
| 2014/0233663 A1* | 8/2014 | Kang | H04L 5/0037 375/260 |
| 2016/0014758 A1* | 1/2016 | Lee | H04B 7/024 370/329 |
| 2016/0183174 A1* | 6/2016 | Xie | H04W 48/18 455/436 |
| 2016/0309355 A1* | 10/2016 | Seo | H04W 72/04 |

FOREIGN PATENT DOCUMENTS

| | | |
|---|---|---|
| JP | 2008278268 A | 11/2008 |
| WO | WO-2009047971 A1 | 4/2009 |

OTHER PUBLICATIONS

ETRI: "Discussion on further details of Scenario 4", 3GPP Draft; R1-111000 Comp Scenario 4, 3rd Generation Partnership Project (3GPP), Mobile Competence Centre; 650, Route Des Lucioles; F-06921 Sophia-Antipolis Cedex; France, RAN WG1, No. Taipei, Taiwan, Feb. 15, 2011, XP050490699, [retrieved on Feb. 15, 2011].
International Search Report and Written Opinion—PCT/US2012/026056—ISA/EPO—May 16, 2012.
NTT DOCOMO: "CoMP with Lower Tx Power RRH in Heterogeneous Network", 3GPP Draft; R1-110867 Comp in Hetnet, 3rd Generation Partnership Project (3GPP), Mobile Competence Centre ; 650, Route Des Lucioles ; F-06921 Sophi A-Antipolis Cedex ; France, vol. RAN WG1, No. Taipei, Taiwan; Feb. 21, 2011, Feb. 15, 2011 (Feb. 15, 2011), XP050490635,.
Ericsson: "Aspects on Distributed RRUs with Shared Cell-ID for Heterogeneous Deployments", 3GPP TSG-RAN WG1#64 R1-110649, Feb. 21, 2011, pp. 1-12.

\* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

DISCOVERY REFERENCE SIGNAL DESIGN FOR COORDINATED MULTIPOINT OPERATIONS IN HETEROGENEOUS NETWORKS

CLAIM OF PRIORITY UNDER 35 U.S.C. §119

The present application for Patent claims priority to U.S. Provisional Application No. 61/445,420, entitled "RRH DISCOVERY PILOT DESIGN FOR HETNET COMP," filed Feb. 22, 2011, and assigned to the assignee hereof and hereby expressly incorporated by reference herein.

BACKGROUND

I. Field

Certain aspects of the disclosure generally relate to wireless communications and, more particularly, to techniques for access procedures in heterogeneous networks (HetNet) with coordinated multi-point (CoMP) transmission and reception.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations (BS) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided.

Certain aspects of the present disclosure provide techniques for wireless communications by a user equipment (UE). The techniques generally include receiving distinct discovery reference signals (RSs) transmitted from a plurality of different transmission points involved in coordinated multipoint (CoMP) operations with the UE, calculating path loss estimations for each of the transmission points based on the distinct discovery RSs, and performing a random access channel (RACH) procedure with a transmission power level set based on the path loss estimations.

Certain aspects of the present disclosure provide techniques for wireless communications by a transmission point. The techniques generally include determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE and transmitting the discovery RS using the determined resources.

Certain aspects of the present disclosure provide an apparatus for wireless communications by a user equipment (UE). The apparatus generally includes means for receiving distinct discovery reference signals (RSs) transmitted from a plurality of different transmission points involved in coordinated multipoint (CoMP) operations with the UE, means for calculating path loss estimations for each of the transmission points based on the distinct discovery RSs, and means for performing a random access channel (RACH) procedure with a transmission power level set based on the path loss estimations.

Certain aspects of the present disclosure provide an apparatus for wireless communications by a transmission point. The apparatus generally include means for determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE and means for transmitting the discovery RS using the determined resources.

Certain aspects of the present disclosure provide an apparatus for wireless communications by a user equipment (UE). The apparatus generally includes at least one processor configured to receive distinct discovery reference signals (RSs) transmitted from a plurality of different transmission points involved in coordinated multipoint (CoMP) operations with the UE, calculate at least one of path loss or reference signal received power (RSRP) estimations for each of the transmission points based on the distinct discovery RSs, and identify at least one serving cell based on the estimations; and a memory coupled with the at least one processor.

Certain aspects of the present disclosure provide an apparatus for wireless communications by a transmission point. The apparatus generally include at least one processor configured to determine resources for transmitting a discovery reference signal (RS) for discovery by a user equipment (UE), the determined resources being distinct from resources used for transmitting discovery RS by one or more other transmission points involved in coordinated multipoint (CoMP) operations with the UE and transmit the discovery RS using the determined resources; and a memory coupled with the at least one processor.

Certain aspects of the present disclosure provide a program product comprising a computer readable medium having instructions stored thereon. The instructions are executable by one or more processors for receiving, by a user equipment (UE), distinct discovery reference signals (RSs) transmitted from a plurality of different transmission points involved in coordinated multipoint (CoMP) operations with the UE, calculating at least one of path loss or reference signal received power (RSRP) estimations for each of the transmission points based on the distinct discovery RSs, and identifying at least one serving cell based on the estimations.

Certain aspects of the present disclosure provide a program product comprising a computer readable medium having instructions stored thereon. The instructions are executable by one or more processors for determining, at a transmission point, resources for transmitting a discovery reference signal (RS) for discovery by a user equipment (UE), the determined resources being distinct from resources used for transmitting discovery RS by one or more other transmission points involved in coordinated multipoint (CoMP) operations with the UE and transmitting the discovery RS using the determined resources.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

Aspects of the present disclosure provide techniques that may be utilized in a random access procedure in a heterogeneous network (HetNet) in which coordinated multipoint (CoMP) operations are utilized. By providing different transmission points distinct resources for transmitting reference signals (RSs), a user equipment (UE) may estimate path loss to each transmission point and adjust transmission power of random access channel (RACH) based on the estimated path losses (e.g., based on the lowest path loss, which may indicate a closest transmission point).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
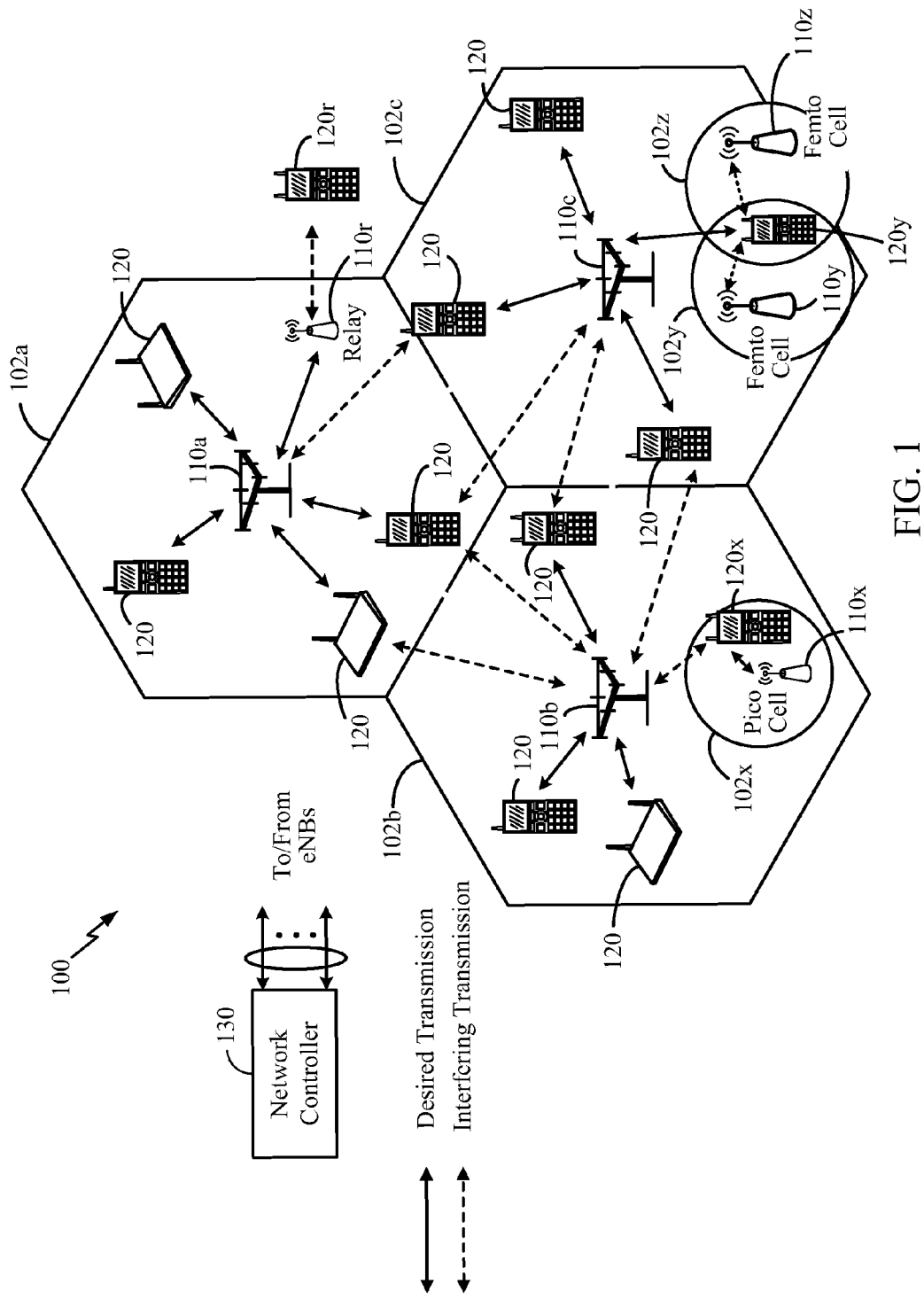
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110*a*, 110*b*, and 110*c* may be macro eNBs for macro cells 102*a*, 102*b*, and 102*c*, respectively. eNB 110*x* may be a pico eNB for a pico cell 102*x*. eNBs 110*y* and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
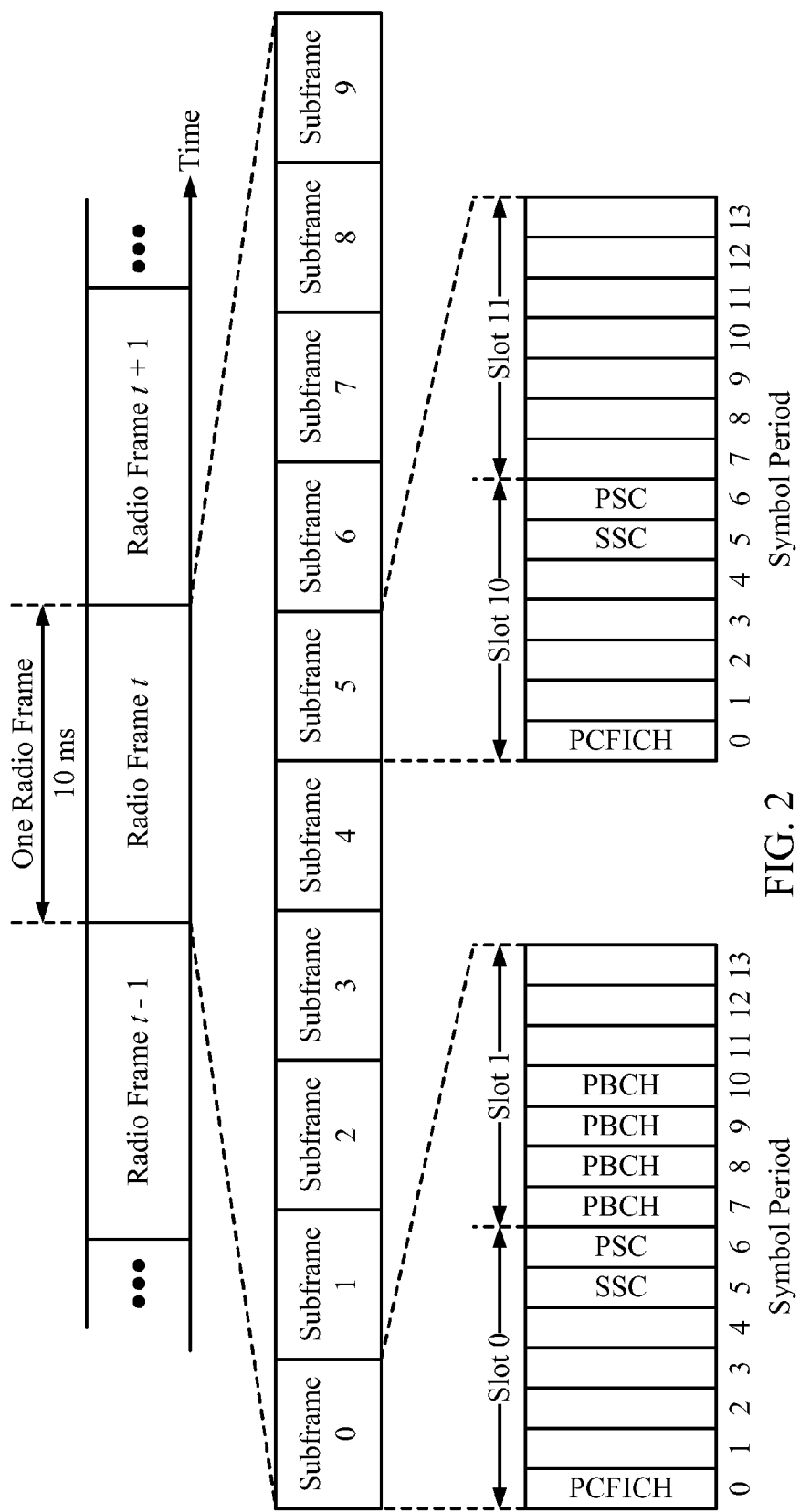
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
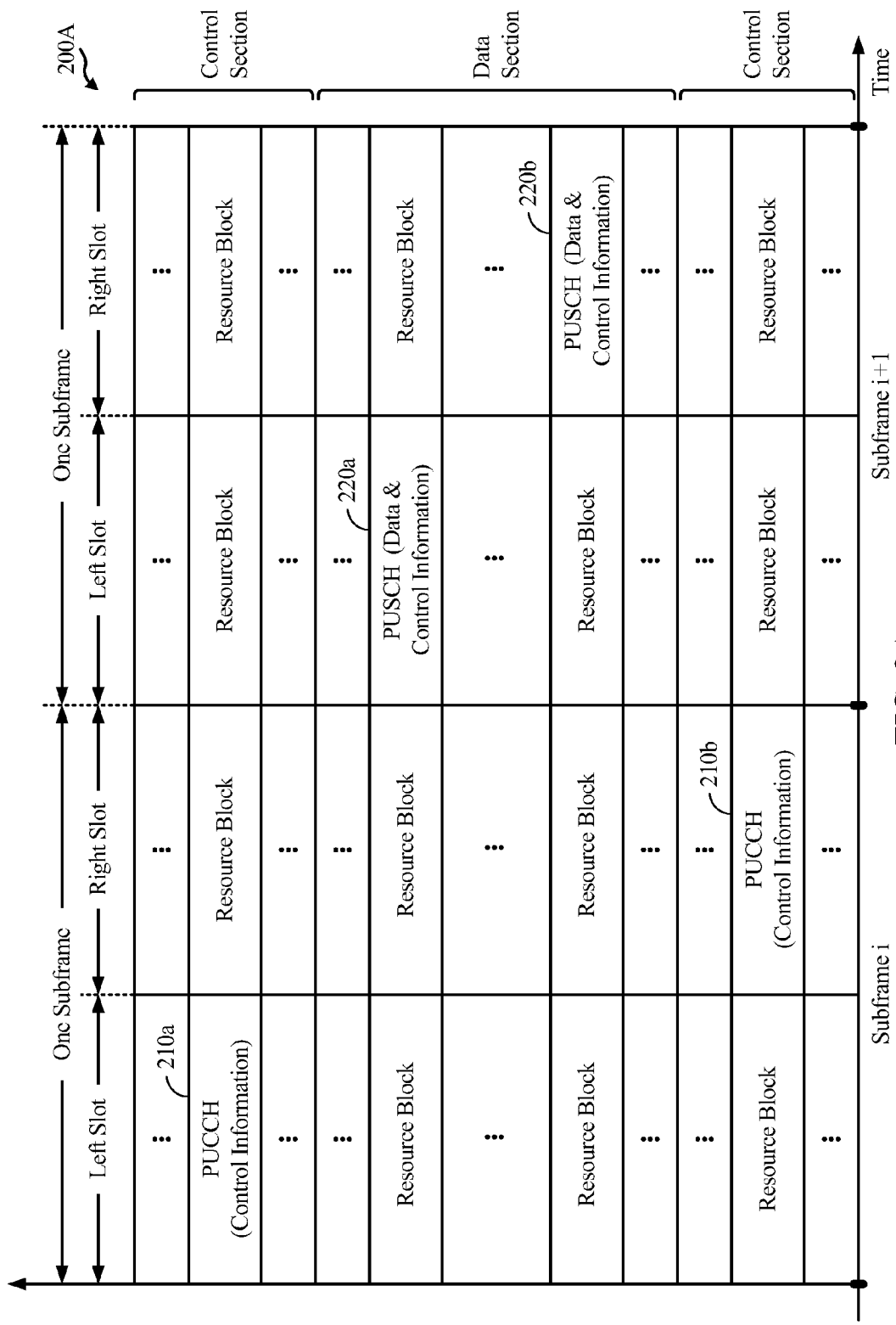
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
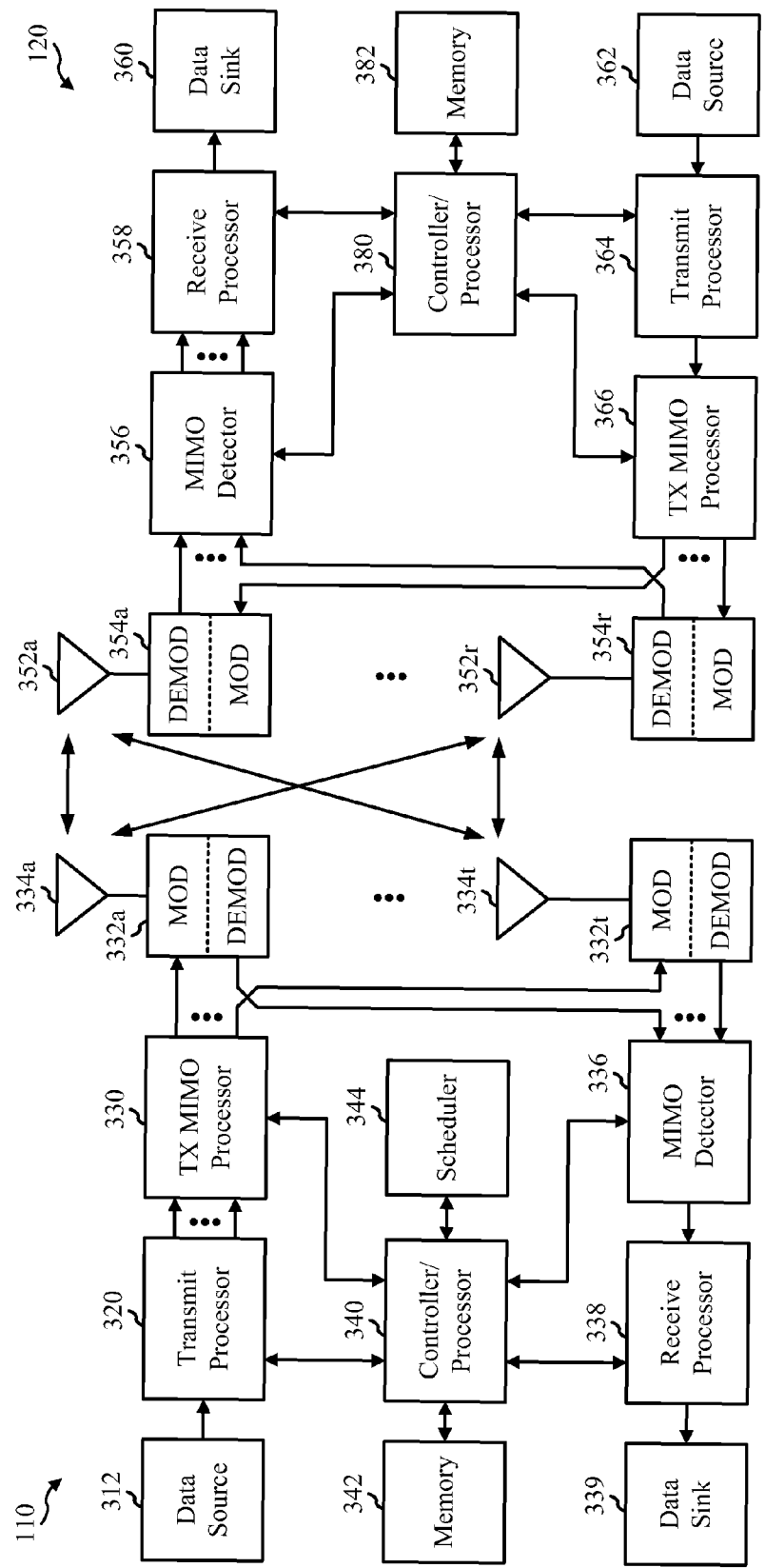
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
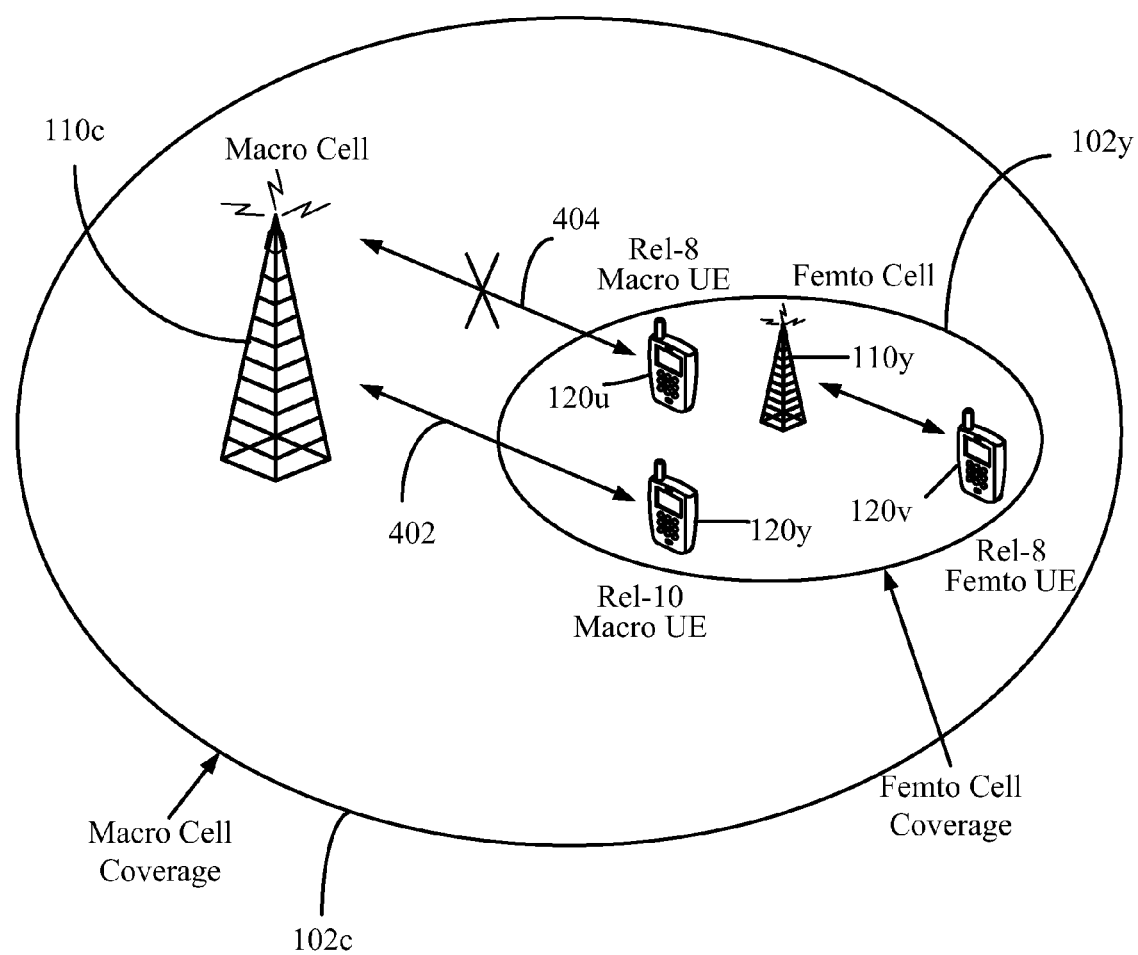
FIG. 4 illustrates an example heterogeneous network (HetNet) in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these sets may be referred to as Semi-static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$\text{Index}_{SRPI\_DL}=(\text{SFN}*10+\text{subframe number}) \bmod 8$$

For the uplink, the SRPI mapping may be shifted, for example, by 4 ms. Thus, an example for the uplink may be:

$$\text{Index}_{SRPI\_UL}=(\text{SFN}*10+\text{subframe number}+4) \bmod 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identifiers (PCIs).

ARPI may represent further resource partitioning information with the detailed information for the 'X' subframes in SRPI. As noted above, detailed information for the 'X' subframes is typically only known to the base stations, and a UE does not know it.

Figure 6:
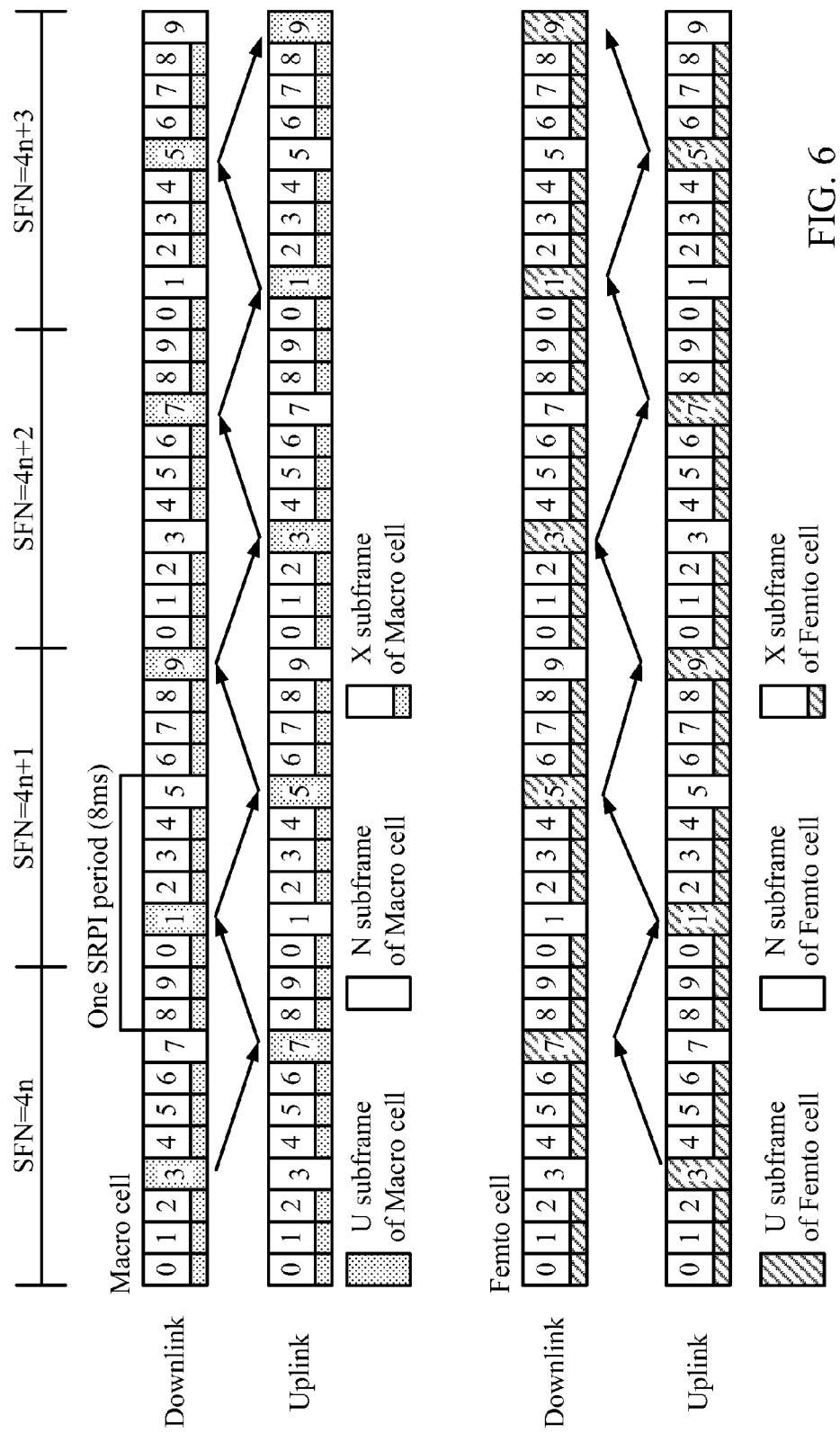
FIG. 6 illustrates example cooperative partitioning of subframes in a heterogeneous network in accordance with certain aspects of the present disclosure.

FIGS. 5 and 6 illustrate examples of SRPI assignment in the scenario with macro and femto cells. A U, N, X, or C subframe is a subframe corresponding to a U, N, X, or C SRPI assignment.

Figure 7:
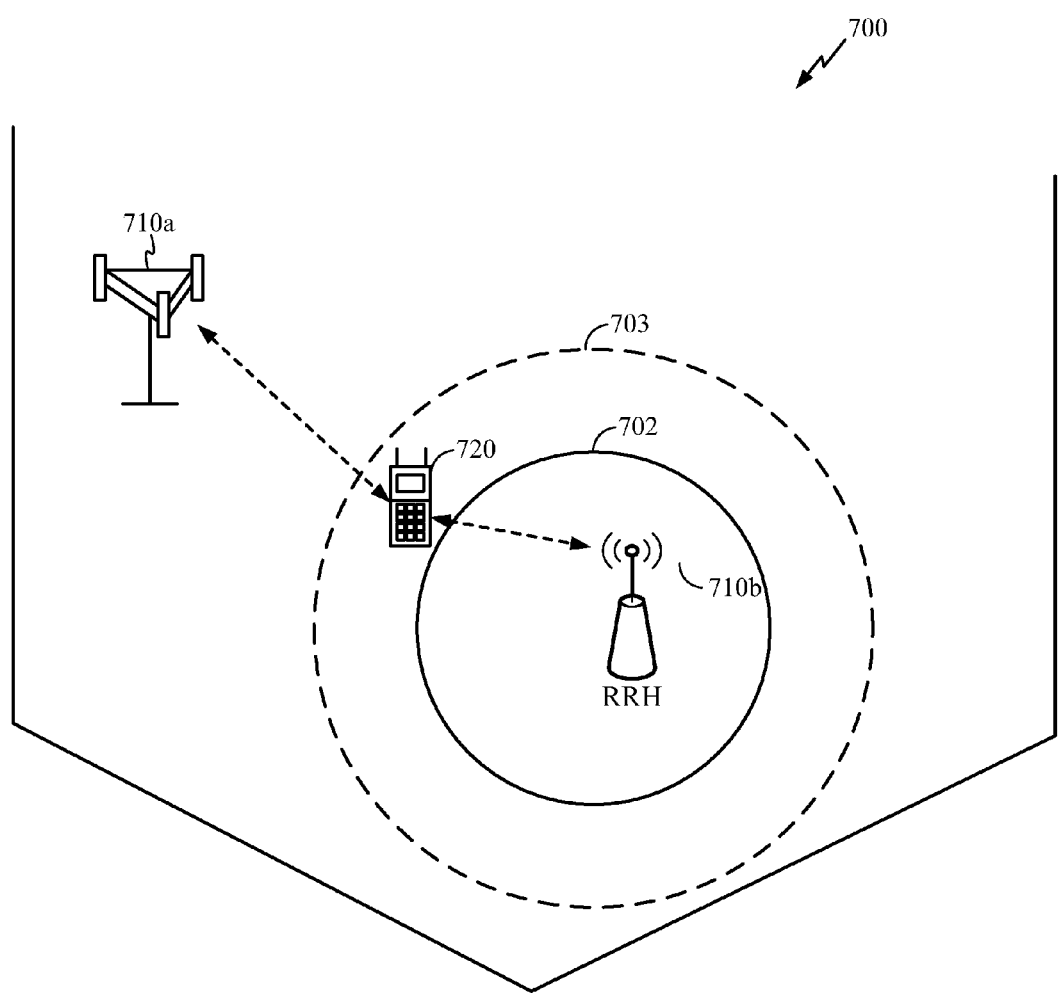
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
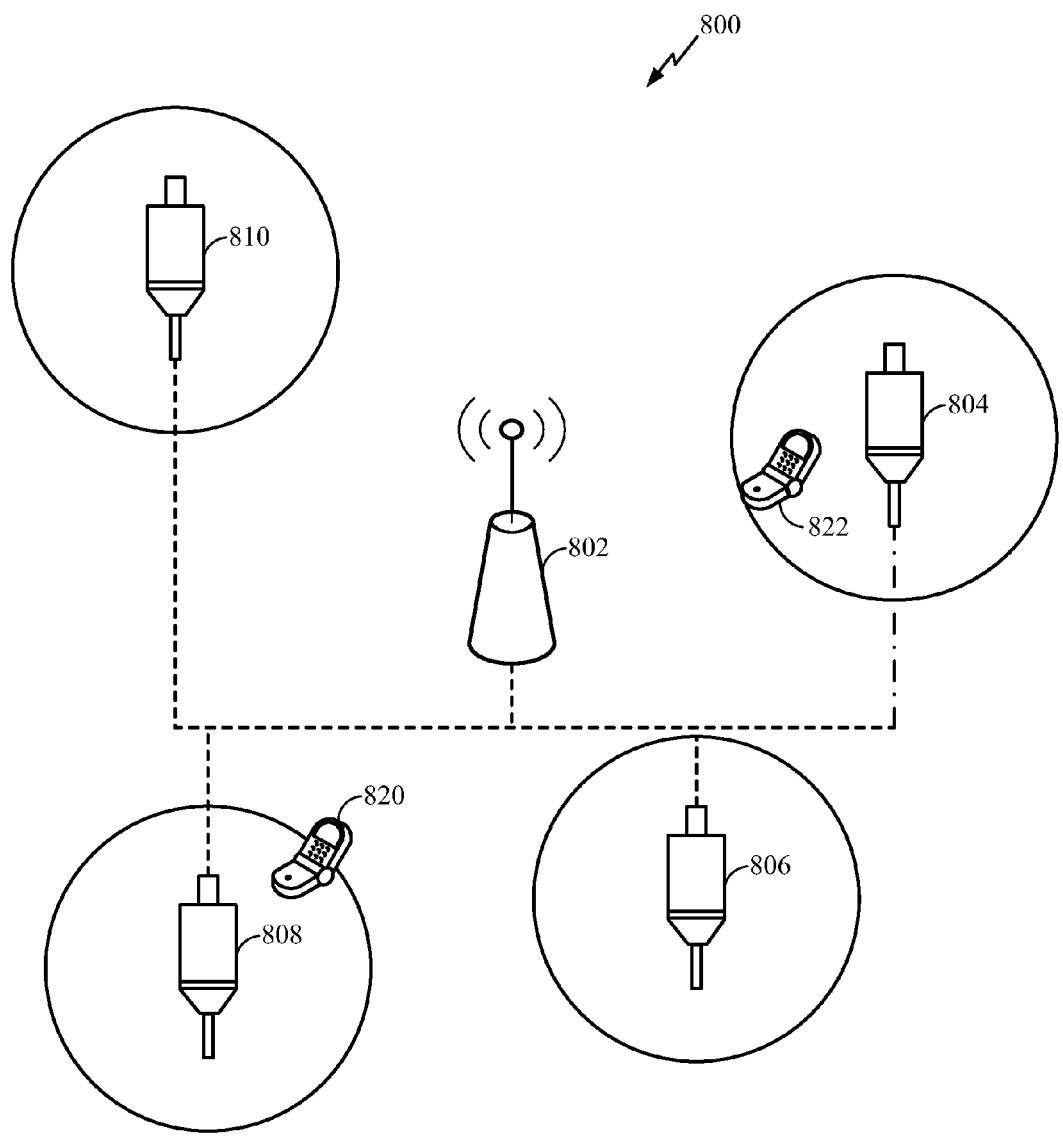
FIG. 8 is a diagram illustrating a network with a macro eNB and remote radio heads (RRHs) in accordance with certain aspects of the present disclosure.

FIG. 8 is a diagram illustrating a network 800, which includes a macro node and a number of remote radio heads (RRHs) in accordance with certain aspects of the present disclosure. The macro node 802 is connected to RRHs 804, 806, 808, 810 with optical fiber. In certain aspects, network 800 may be a homogeneous network or a heterogeneous network and the RRHs 804-810 may be low power or high power RRHs. In an aspect, the macro node 802 handles all scheduling within the cell, for itself and the RRHs. The RRHs may be configured with the same cell identifier (ID) as the macro node 802 or with different cell IDs. If the RRHs are configured with the same cell ID, the macro node 802 and the RRHs may operate as essentially one cell controlled by the macro node 802. On the other hand, if the RRHs and the macro node 802 are configured with different cell IDs, the macro node 802 and the RRHs may appear to a UE as different cells, though all control and scheduling may still remain with the macro node 802. It should further be appreciated that the processing for the macro node 802 and the RRHs 804, 806, 808, 810 may not necessarily have to reside at the macro node. It may also be performed in a centralized fashion at some other network device or entity that is connected with the macro and the RRHs.

As used herein, the term transmission/reception point ("TxP") generally refers geographically separated transmission/reception nodes controlled by at least one central entity (e.g., eNodeB), which may have the same or different cell IDs.

In certain aspects, when each of the RRHs share the same cell ID with the macro node 802, control information may be transmitted using CRS from the macro node 802 or both the macro node 802 and all of the RRHs. The CRS is typically transmitted from each of the transmission points using the same resource elements, and therefore the signals collide. When each of the transmission points has the same cell ID, CRS transmitted from each of the transmission points may not be differentiated. In certain aspects, when the RRHs have different cell IDs, the CRS transmitted from each of the TxPs using the same resource elements may or may not collide. Even in the case, when the RRHs have different cell IDs and the CRS collide, advanced UEs may differentiate CRS transmitted from each of the TxPs using interference cancellation techniques and advanced receiver processing.

In certain aspects, when all transmission points are configured with the same cell ID and CRS is transmitted from all transmission points, proper antenna virtualization is needed if there are an unequal number of physical antennas at the transmitting macro node and/or RRHs. That is, CRS is to be transmitted with an equal number of CRS antenna ports. For example, if the node 802 and the RRHs 804, 806, 808 each have four physical antennas and the RRH 810 has two physical antennas, a first antenna of the RRH 810 may be configured to transmit using two CRS ports and a second antenna of the RRH 810 may be configured to transmit using a different two CRS ports. Alternatively, for the same deployment, macro 802 and RRHs 804, 806, 808, may transmit only two CRS antenna ports from selected two out of the four transmit antennas per transmission point. Based on these examples, it should be appreciated that the number of antenna ports may be increased or decreased in relation to the number of physical antennas.

As discussed supra, when all transmission points are configured with the same cell ID, the macro node 802 and the RRHs 804-810 may all transmit CRS. However, if only the macro node 802 transmits CRS, outage may occur close to an RRH due to automatic gain control (AGC) issues. In such a scenario, CRS based transmission from the macro 802 may be received at low receive power while other transmissions originating from the close-by RRH may be received at much larger power. This power imbalance may lead to the aforementioned AGC issues.

In summary, typically, a difference between same/different cell ID setups relates to control and legacy issues and other potential operations relying on CRS. The scenario with different cell IDs, but colliding CRS configuration may have similarities with the same cell ID setup, which by definition has colliding CRS. The scenario with different cell IDs and colliding CRS typically has the advantage compared to the same cell ID case that system characteristics/components which depend on the cell ID (e.g., scrambling sequences, etc.) may be more easily differentiated.

The exemplary configurations are applicable to macro/RRH setups with same or different cell IDs. In the case of different cell IDs, CRS may be configured to be colliding, which may lead to a similar scenario as the same cell ID case but has the advantage that system characteristics which depend on the cell ID (e.g., scrambling sequences, etc.) may be more easily differentiated by the UE).

In certain aspects, an exemplary macro/RRH entity may provide for separation of control/data transmissions within the transmission points of this macro/RRH setup. When the cell ID is the same for each transmission point, the PDCCH may be transmitted with CRS from the macro node 802 or both the macro node 802 and the RRHs 804-810, while the PDSCH may be transmitted with channel state information reference signal (CSI-RS) and demodulation reference signal (DM-RS) from a subset of the transmission points. When the cell ID is different for some of the transmission points, PDCCH may be transmitted with CRS in each cell ID group. The CRS transmitted from each cell ID group may or may not collide. UEs may not differentiate CRS transmitted from multiple transmission points with the same cell ID, but may differentiate CRS transmitted from multiple transmission points with different cell IDs (e.g., using interference cancellation or similar techniques).

In certain aspects, in the case where all transmission points are configured with the same cell ID, the separation of control/data transmissions enables a UE transparent way of associating UEs with at least one transmission point for data transmission while transmitting control based on CRS transmissions from all the transmission points. This enables cell splitting for data transmission across different transmission points while leaving the control channel common. The term "association" above means the configuration of antenna ports for a specific UE for data transmission. This is different from the association that would be performed in the context of handover. Control may be transmitted based on CRS as discussed supra. Separating control and data may allow for a faster reconfiguration of the antenna ports that are used for a UE's data transmission compared to having to go through a handover process. In certain aspects, cross transmission point feedback may be possible by configuring a UE's antenna ports to correspond to the physical antennas of different transmission points.

In certain aspects, UE-specific reference signals enable this operation (e.g., in the context of LTE-A, Rel-10 and above). CSI-RS and DM-RS are the reference signals used in the LTE-A context. Interference estimation may be carried out based on or facilitated by CSI-RS muting. When control channels are common to all transmission points in the case of a same cell ID setup, there may be control capacity issues because PDCCH capacity may be limited. Control capacity may be enlarged by using FDM control channels. Relay PDCCH (R-PDCCH) or extensions thereof, such as an enhanced PDCCH (ePDCCH) may be used to supplement, augment, or replace the PDCCH control channel.

Discovery Reference Signal Design for Coordinated Multipoint Operations in Heterogeneous Networks Techniques provided herein allow different transmission points to transmit distinct reference signals for discovery by a UE. For example, transmission points of a first power class (e.g., low power RRHs) may transmit discovery RSs on a first set of resources, while transmission points of a second power class (e.g., a higher power macro eNB) may transmit discovery RSs on a second set of resources. As will be described in greater detail below, this may allow a UE to perform an access procedure with transmit power set in an appropriate manner for the transmission point it is likely to be targeting (e.g., a closest RRH).

For HetNet CoMP design, as described above, one active proposal for the LTE Rel 11 is to deploy remote radio heads (RRHs) with fiber connections to the Macro eNB. The RRHs may have the same physical cell ID (PCI) as the Macro cell. In scenarios where RRHs and the Macro base station have the same cell ID, the UE cannot identify RRH prior to the RACH procedure.

Due to the large difference in transmission power between the macro eNB and RRHs, the inability to identify the RRH may lead to problems when the UE performs the random access channel (RACH) procedure applying open loop power control. For example, with the ambiguity between Macro cell and RRH, the UE can easily jam the close by RRH by 20 dB if it sets transmission power too high based on a far away Macro cell. On the other hand, setting the sets transmission power too low, based on the RRH, may lead to delays in the RACH procedure.

According to certain aspects, a distinct pilot or reference signal (RS) for RRH discovery may be used to allow the UE to distinguish between the RRH and Macro cell. The configurations and power settings may be specified in the system information block (SIB) transmission from the large logical cell including Macro and RRH.

This RRH discovery pilot that allows the UE to distinguish between RRHs and the macro eNB may be useful for several functions. For example, the RRH discovery pilot may aid in open loop power control setting for RACH procedure, time tracking for the UE for RRH, position location (based on relative receive strength of pilots from different transmission points), and early identification of Rel 11 UEs from the network side.

Many aspects of the RRH discovery signal may allow a UE to calculate relatively accurate path loss estimation from the RRH. This path loss estimation may be used when user equipment (UE) tries to access the system initially and needs to send the physical random access channel (PRACH) in the uplink.

Conventionally, initial transmit power is based on open loop power control by measuring DL path loss from the common reference signal (CRS). It is typically desirable to be able to set transmission power for PRACH at right level so that the nearest RRH or macro eNB can correctly decode the PRACH (without jamming the RRH or causing delay in decoding by the macro eNB). However, accurate PL measurement is unavailable when RRH and Macro cell have the same PCI (Physical Cell Identifier), SFN (System Frame Number) or CRS, but different transmit power, or when only Macro transmits CRS and RRH mutes CRS.

As noted above, in the system with the same PCI for RRH and Macro base station, there may be a larger error in open loop power control (OL PC) for RACH. Too high a transmit power for PRACH transmission will jam the closest RRH, and too little PRACH transmission power will delay access time.

The discover RRH pilots (or RS) described herein, however, provide a way for the UE to be able to estimate the path-loss from each RRH before RACH procedure. In addition to path loss estimation and open loop power control, it may also be desirable to be able to identify the closest cell (e.g., Macro vs. RRH or early RRH discovery). This information can be useful for UE timing adjustment, position location, mobility handling, and early identification of Rel 11 from UEs from earlier releases.

An Example Access Procedure Based on RRH Discovery RS

The techniques presented herein allow for a new access procedure and signal design for RRH discovery for Rel 11 UEs. The techniques may be used in various system scenarios, such as the case (Case 1a) where the macro transmits certain signals (e.g., CRS/PSS/SSS/PBCH) while the RRH mutes them or the case where the Macro and RRH both transmit CRS/PSS/SSS/PBCH in SFN (synchronous frequency network).

As used herein, the term "RRH Discovery RS" generally refers to RS transmitted in a manner that makes it possible to distinguish between RS transmitted by an RRH and RS transmitted by a macro eNB, thus allowing a UE to "discover" the RRHs.

The first step in an access procedure may be PSS/SSS, PBCH detection. UEs of different capabilities (e.g., UEs from Rel 8-11 perform an initial acquisition procedure as Rel 8). After this initial acquisition, the number of CRS antenna ports may be know.

In a second step, the UE may detect system information blocks (e.g., SIB1 and SIB2). After decoding of these SIBs, the UE becomes aware of common system information. Conventional UEs (e.g., Rel 8/9/10 UEs) may perform access according to the conventional RACH procedure.

In addition to obtaining common system information (as the conventional Rel-8/9/10 UEs described above, UEs according to the present disclosure (e.g., Rel-11 UEs configured to operate as described herein) may be able to get the following information; configuration of "RRH Discovery RS" antenna ports, as well as transmit power levels for RRH discovery RS.

In some cases, antenna ports of transmission points of the same power class (e.g., RRHs) may be mapped to the same distinct resource for transmitting discovery RS. The eNB RS may be mapped to a different distinct resource.

Figure 9:
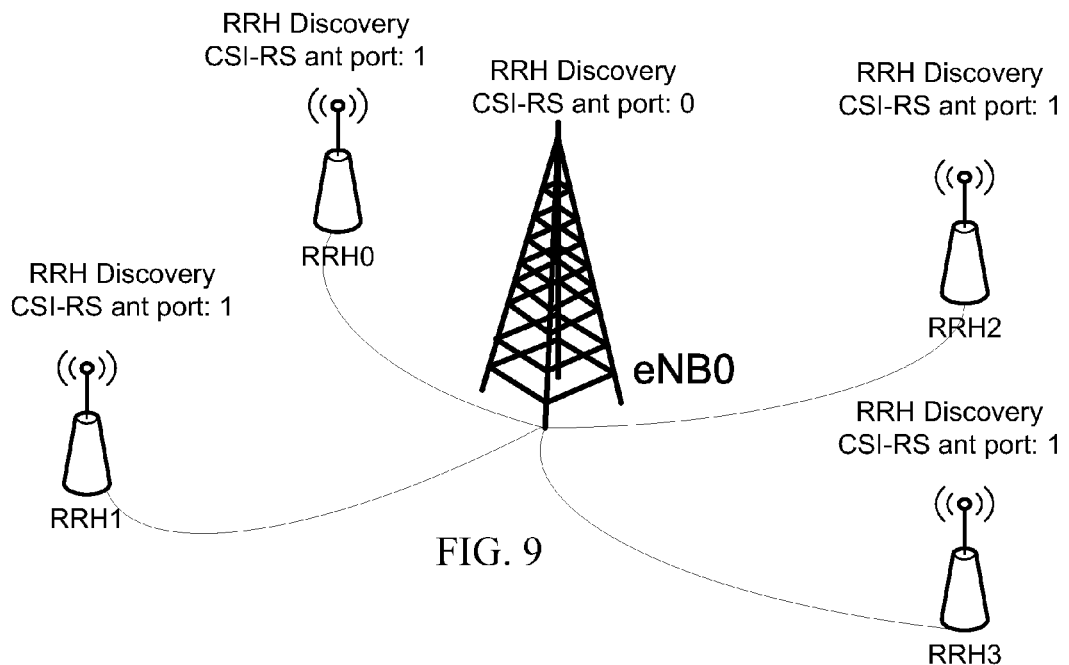
FIG. 9 illustrates an example scenario for HetNet CoMP, in accordance with certain aspects of the present disclosure.
Figure 10:
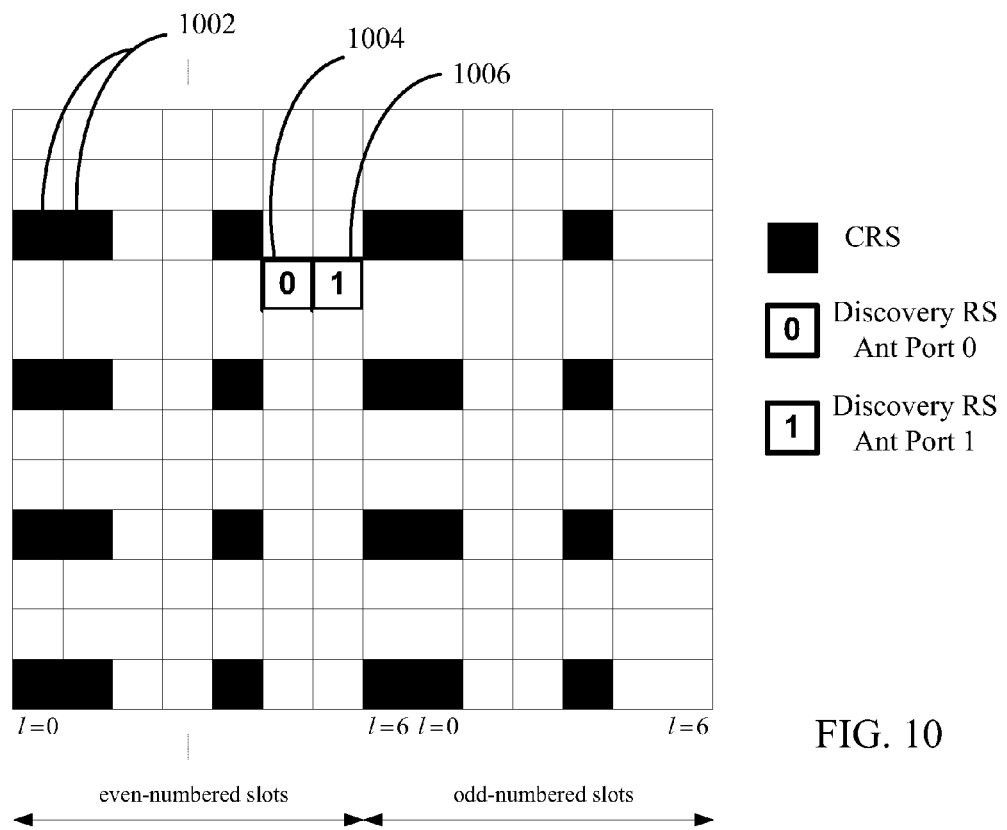
FIG. 10 illustrates an example configuration of discovery reference signals (RSs), in accordance with aspects of the present disclosure.

For example, as illustrated in FIGS. 9 and 10, RRH discovery RS may be transmitted from each RRH with a first antenna port (port 1 in the example) using a first resource, while discovery RS may be transmitted from the macro eNB with a second resource (port 0 in this example). FIG. 10 illustrates how distinct resources 1004 and 1006 may be used for discovery RS transmitted from antenna ports 0 and 1, respectively, separate from resources 1002 used for CRS.

Figure 11:
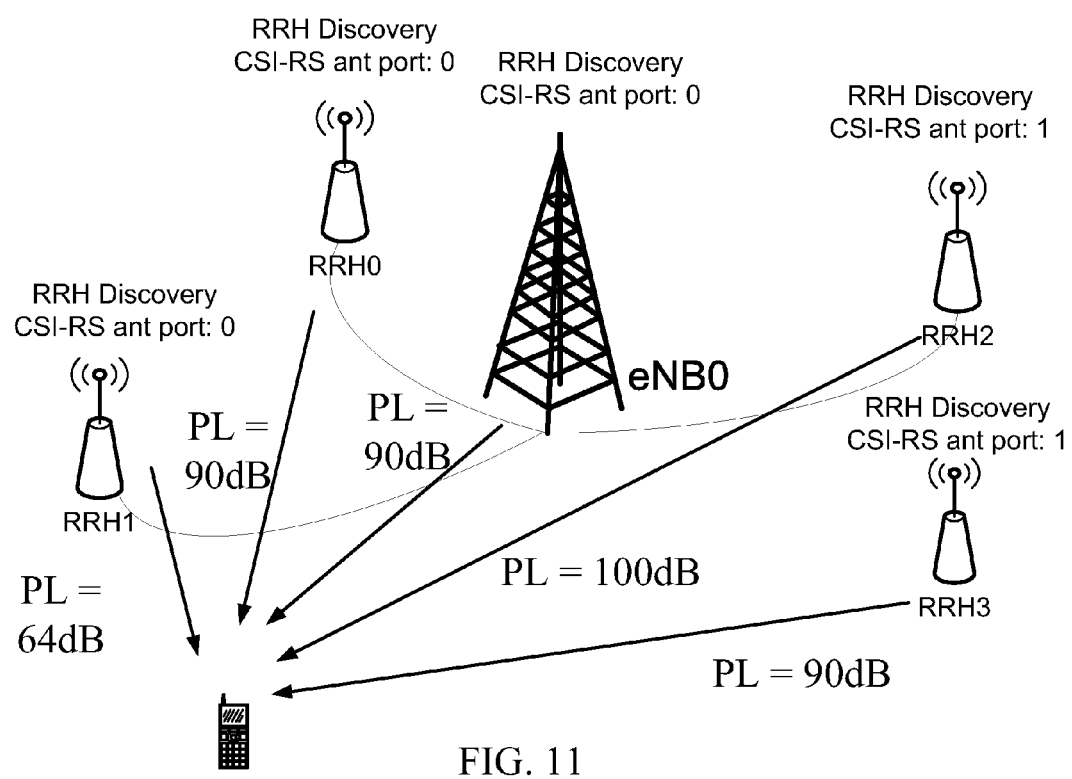
FIG. 11 illustrates example path loss estimates, in accordance with certain aspects of the present disclosure.

After receiving distinct RS from different transmission points, the UE may be able to estimate path loss for each transmission point. For example, as illustrated in FIG. 11, the UE may measure path loss from each cell/power class based on the advertised power and receiver power of the corresponding RRH discovery RS port. The UE may also receive an indication of transmit power used for each RRH discovery RS port (e.g. in one or more messages with one or more fields indicating corresponding transmit power). Given the capability of path loss estimation for each RRH, the UE may be able to more accurately set transmission power for PRACH. At the same time, the UE may also identify surrounding RRH/Macro cell based on the received signal from these RRH discovery RS.

In the example of RRH Discovery Based PL Estimation by the UE shown in FIG. 11, PL to the macro eNB, calculated by subtracting receive power over port 0 from the advertised transmit power, is 90 dB. The PL for RRH0, RRH1, RRH2, and RRH3, respectively, calculated by subtracting receiver power over port 1 from the advertise transmit power for each RRH, is 90 dB, 64 dB, 100 dB, and 90 dB, respectively.

In this example, because the UE is close to RRH1, it may have large DL path loss from the eNB0, but a small path loss to the close by RRH1. In this scenario, UL transmission based on conventional OL PC may jam the RRH. However, based on these PL measurements taken based on RRH Discovery RS, the UE may determine it is closest to RRH1 and perform access with transmit power adjusted based on the PL to RRH1.

In addition to the RRH discovery RS, we can also broad cast RACH configurations for each RRH. In such a case, the UE may use the correct RACH configuration to access the closest RRH and may achieve cell splitting gain in the SFN area.

According to certain aspects, RRH Discovery RS antenna ports can be used for estimation of received power from transmission points of each power class type. For example, in the example of FIGS. 9 and 10, all RRHs are mapped to the same resource for transmitting RS. In some cases, however, each node or each RRH may have its own distinct resources for transmitting RRH Discovery RS. In some cases, these may be common to all "non-legacy" (e.g., Rel 11) UEs in one logical cell. As noted above, one power class/node may be mapped to one of the RRH Discovery RS ports.

According to certain aspects, CSI-RS designs may be used for RRH Discovery RS by assigning different CSI-RS ports to different RRH or different power classes, as noted above. As a result, CSI-RS processing may also be reused for RRH discovery to reduce the implementation complexity. Frequency division multiplexing (FDM) or time division multiplexing (TDM) between different power class cells may be utilized. However, code division multiplexing CDM between different power classes may not provide sufficient orthogonality if there is large power disparity.

Certain aspects of the present disclosure may provide a different design for RRH discovery RS by having denser frequency tone allocation (and/or denser time allocation) for RRH discovery RS than CSI-RS. As noted above, in some cases, only the antennas from the same power class nodes may be mapped to one of the RRH discovery RS. If CSI-RS is configured as RRH discovery RS, different power classes may be mapped to different frequency and time positions.

As noted above, transmission points (e.g., a serving eNB) may signal different RRH discovery RS as well as its power level in SIBs to allow accurate path loss estimation to different power class nodes. In these cases, OL PC may be based on the estimated path loss from RRH discovery RS.

It is also possible to signal RACH configurations in SIB linked to different RRH discovery RS. This can be used to achieve cell splitting gain starting from RACH procedure. This can also be used to identify UEs capable of discovering RRHs in this manner, starting from RACH procedure.

Figure 12:
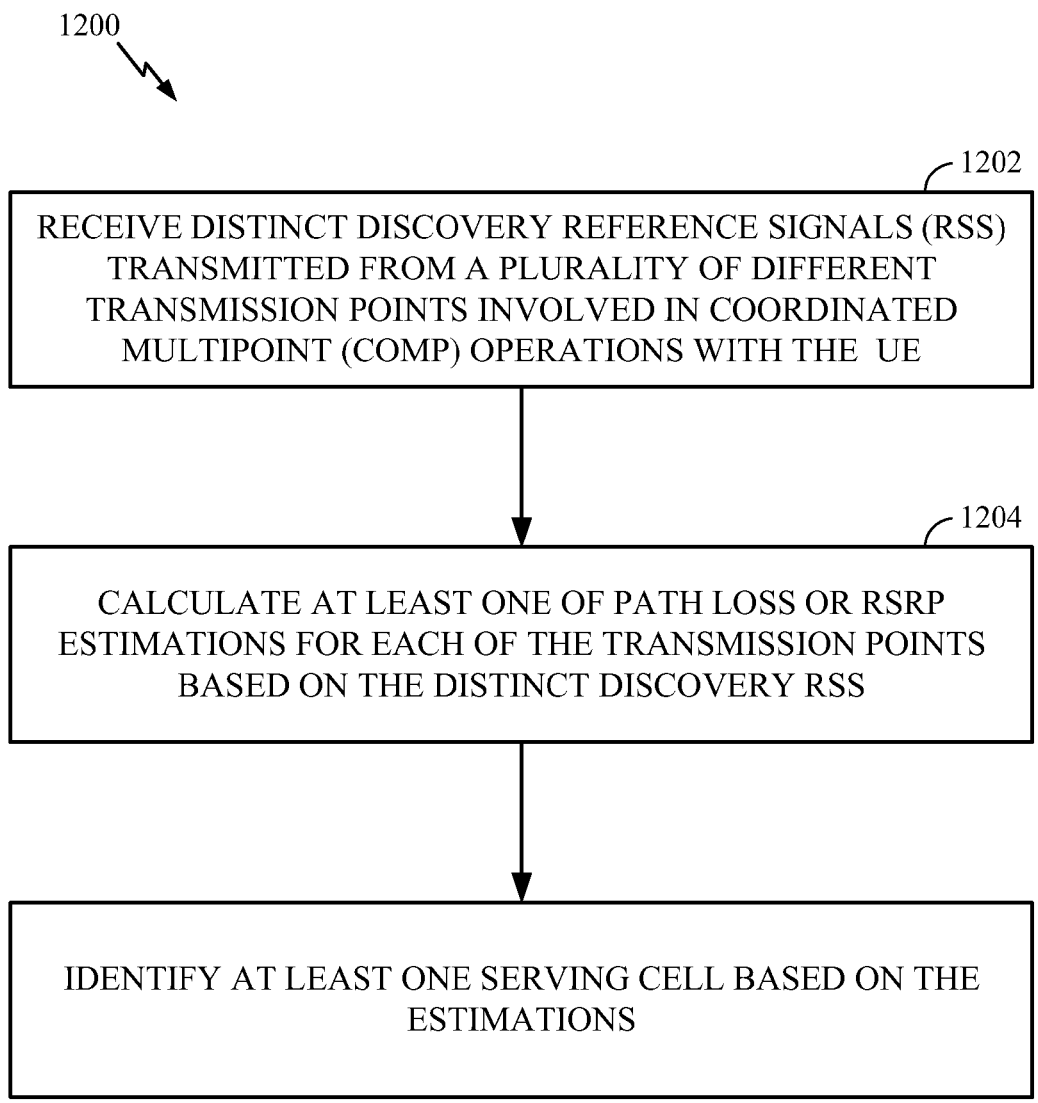
FIG. 12 illustrates example operations 1200, performed at a user equipment (UE), in accordance with certain aspects of the disclosure.

FIG. 12 illustrates example operations 1200, performed by a UE, for RRH discovery, in accordance with certain aspects of the present disclosure. Operations 1200 may be executed, for example at processor(s) 358 and/or 380 of the UE 120 shown in FIG. 3.

Operations 1200 may being, at 1202, by receiving distinct discovery reference signals (RSs) transmitted from a plurality of different transmission points involved in coordinated multipoint (CoMP) operations with the UE. At 1204, the UE may calculate at least one of path loss or reference signal received power (RSRP) estimations for each of the transmission points based on the distinct discovery RSs. At 1206, the UE may identify at least one serving cell based on the estimations. For example, the identifying may be based on a smallest path loss.

Figure 12A:
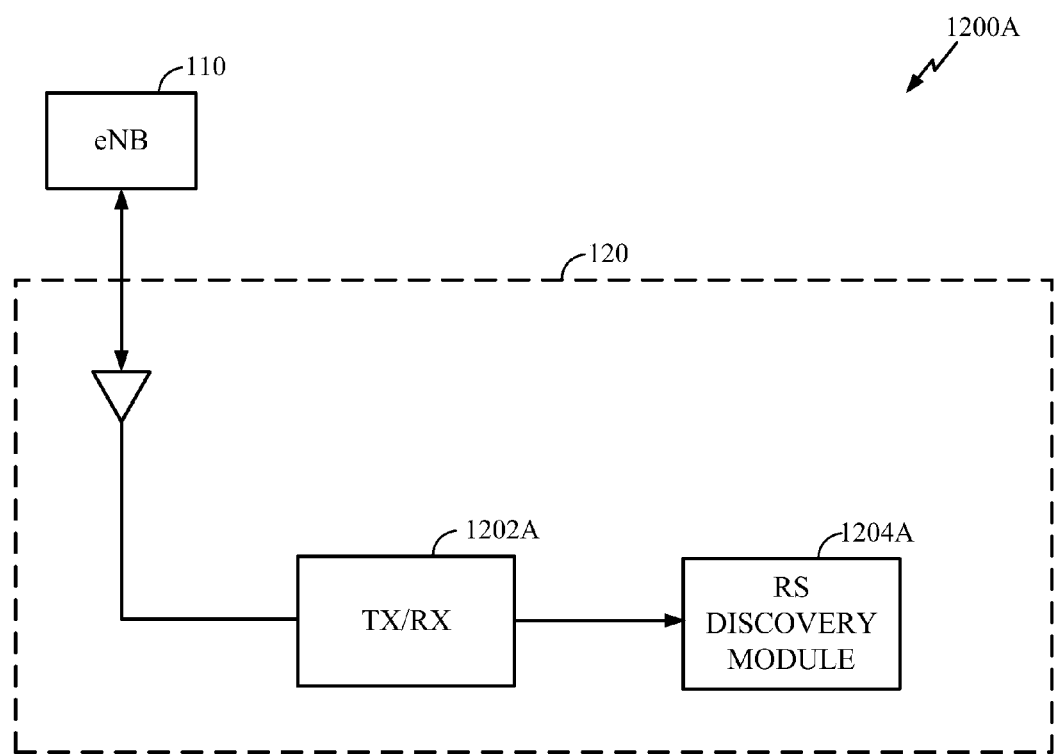
FIG. 12A illustrates example components capable of performing the operations illustrated in FIG. 12 in accordance with certain aspects of the present disclosure.

The operations 1200 may be performed by any suitable components or other means capable of performing the corresponding functions of FIG. 12. For example, the operations 1200 illustrated in FIG. 12 may be performed by components 1200A of a UE, such as a RS discovery module 1204A and transceiver 1202A, illustrated in FIG. 12A.

Figure 13:
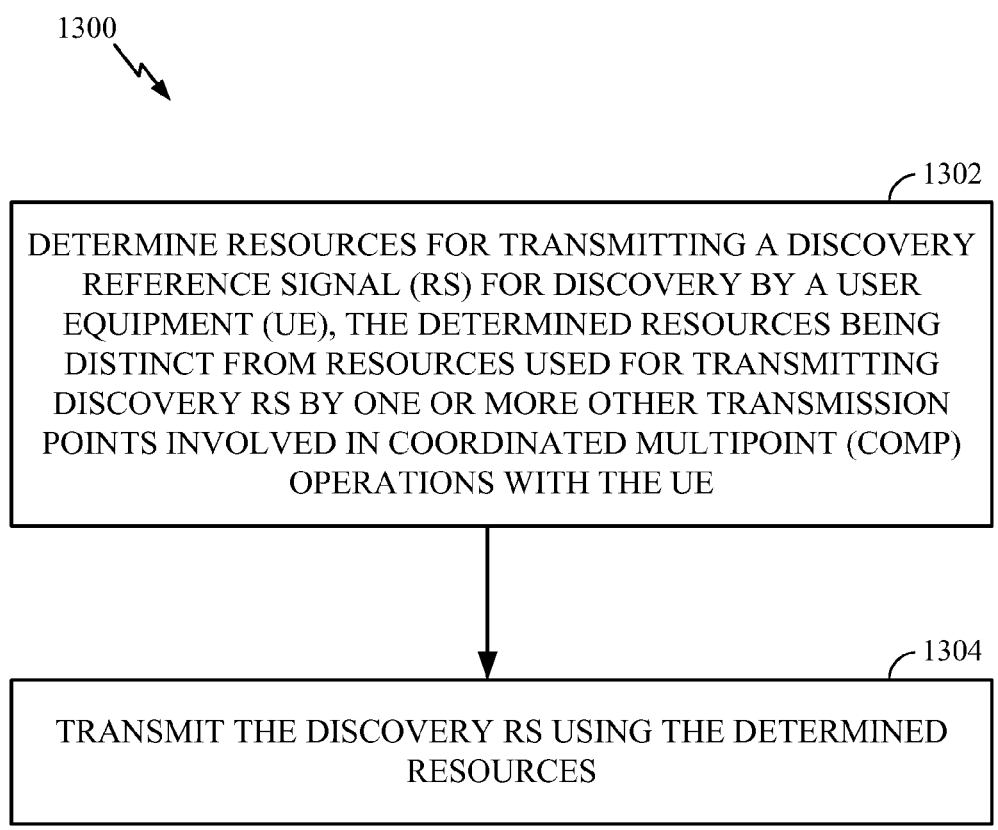
FIG. 13 illustrates example operations 1300, performed at a transmission point, in accordance with certain aspects of the disclosure.

FIG. 13 illustrates example operations 1300, performed at a transmission point (e.g., an RRH or eNB) to allow RRH discovery, in accordance with certain aspects of the disclosure. Operations 1300 may be executed, for example at processor(s) 330 and/or 340 of the eNB 110.

Operations 1300 may begin, at 1302, by determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE. At 1304, the transmission point may transmit the discovery RS using the determined resources.

Figure 13A:
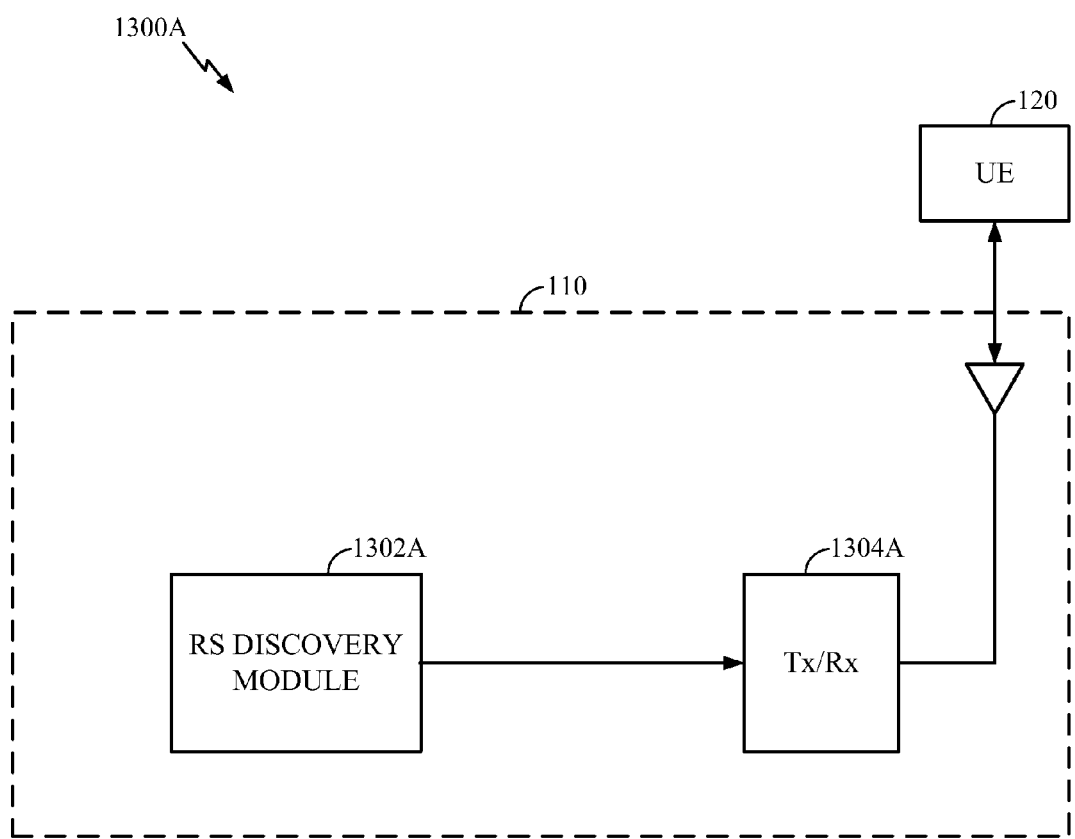
FIG. 13A illustrates example components capable of performing the operations illustrated in FIG. 13 in accordance with certain aspects of the present disclosure.

The operations 1300 described above may be performed by any suitable components or other means capable of performing the corresponding functions of FIG. 13. For example, operations 1300 illustrated in FIG. 13 may be performed by components 1300A of a transmission point, such as a RS discovery module 1302A and transceiver 1304A, illustrated in FIG. 13A.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   receiving a configuration indicating distinct resources used by each of a plurality of different transmission points involved in coordinated multipoint (CoMP) operations with the UE for transmitting distinct discovery reference signals (RSs), wherein:
      the distinct discovery RS for each transmission point is transmitted on resources also used for channel state information reference signals (CSI-RS),
      CSI-RS resources used for transmitting distinct discovery RS from transmission points of different power classes are mapped to different frequency and time positions, and
      resources used for discovery RS have at least one of denser frequency tone allocation or denser time allocation than resources used for CSI-RS;
   receiving the distinct discovery RSs transmitted from the plurality of different transmission points on the distinct resources; and
   calculating at least one of path loss or reference signal received power (RSRP) estimations for each of the transmission points based on the distinct discovery RSs.

2. The method of claim 1, wherein the configuration is received via a broadcast message.

3. The method of claim 2, wherein a random access channel (RACH) procedure is performed with a RACH configuration linked to the configuration received via the broadcast message.

4. The method of claim 1, further comprising receiving an indication of transmit power corresponding to each discovery RS.

5. The method of claim 4, wherein the calculating comprises calculating path loss estimations based on received power of each discovery RS and the corresponding transmit power.

6. The method of claim 5, further comprising:
  determining a discovery RS with a smallest estimated path loss; and
  setting transmission power level for transmission based on that smallest estimated path loss.

7. The method of claim 1, further comprising identifying one or more transmission points based on the distinct discovery RSs.

8. The method of claim 1, wherein the plurality of transmission points comprise transmission points of different power classes.

9. The method of claim 8, wherein antenna ports of transmission points of a same power class are mapped to a common resource.

10. The method of claim 8, wherein the transmission points of different power classes have a same physical cell identifier (PCI).

11. The method of claim 1, further comprising:
  receiving a random access channel (RACH) configuration for each transmission point; and
  using the RACH configuration corresponding to the transmission point with which the RACH procedure is performed.

12. A method for wireless communication by a transmission point, comprising:
  determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE, wherein:
    the distinct discovery RS for each transmission point is transmitted on resources also used for channel state information reference signals (CSI-RS),
    CSI-RS resources used for transmitting distinct discovery RS from transmission points of different power classes are mapped to different frequency and time positions, and
    resources used for discovery RS have at least one of denser frequency tone allocation or denser time allocation than resources used for CSI-RS;
  transmitting a configuration indicating the determined resources used by each transmission point; and
  transmitting the discovery RS using the determined resources.

13. The method of claim 12, wherein the configuration is transmitted in a broadcast message.

14. The method of claim 12, further comprising transmitting an indication of transmit power corresponding to the transmitted discovery RS, allowing the UE to estimate path loss based on the discovery RS.

15. The method of claim 12, wherein the transmission points involved in CoMP operations comprise transmission points of different power classes.

16. The method of claim 15, wherein antenna ports of transmission points of a same power class are mapped to a common resource.

17. The method of claim 15, wherein the transmission points of different power classes have a same physical cell identifier (PCI).

18. An apparatus for wireless communications by a user equipment (UE), comprising:
  means for receiving a configuration indicating distinct resources used by each of a plurality of different transmission points involved in coordinated multipoint (CoMP) operations with the UE for transmitting distinct discovery reference signals (RSs), wherein:
    the distinct discovery RS for each transmission point is transmitted on resources also used for channel state information reference signals (CSI-RS),
    CSI-RS resources used for transmitting distinct discovery RS from transmission points of different power classes are mapped to different frequency and time positions, and
    resources used for discovery RS have at least one of denser frequency tone allocation or denser time allocation than resources used for CSI-RS;
  means for receiving the distinct discovery RSs transmitted from the plurality of different transmission points on the distinct resources; and
  means for calculating at least one of path loss or reference signal received power (RSRP) estimations for each of the transmission points based on the distinct discovery RSs.

19. The apparatus of claim 18, wherein the configuration is received via a broadcast message.

20. The apparatus of claim 19, wherein a random access channel (RACH) procedure is performed with a RACH configuration linked to the configuration received via the broadcast message.

21. The apparatus of claim 18, further comprising means for receiving an indication of transmit power corresponding to each discovery RS.

22. The apparatus of claim 21, wherein the means for calculating comprises means for calculating path loss estimations based on received power of each discovery RS and the corresponding transmit power.

23. The apparatus of claim 22, further comprising:
  means for determining a discovery RS with a smallest estimated path loss; and
  means for setting transmission power level for transmission based on that smallest estimated path loss.

24. The apparatus of claim 18, further comprising means for identifying one or more transmission points based on the distinct discovery RSs.

25. The apparatus of claim 18, wherein the plurality of transmission points comprise transmission points of different power classes.

26. The apparatus of claim 25, wherein antenna ports of transmission points of a same power class are mapped to a common resource.

27. The apparatus of claim 18, further comprising:
  means for receiving a random access channel (RACH) configuration for each transmission point; and
  means for using the RACH configuration corresponding to the transmission point with which the RACH procedure is performed.

28. An apparatus for wireless communication by a transmission point, comprising:
  means for determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE, wherein:
    the distinct discovery RS for each transmission point is transmitted on resources also used for channel state information reference signals (CSI-RS),
    CSI-RS resources used for transmitting distinct discovery RS from transmission points of different power classes are mapped to different frequency and time positions, and resources used for discovery RS have at least one of denser frequency tone allocation or denser time allocation than resources used for CSI-RS;

means for transmitting a configuration indicating the determined resources used by each transmission point; and means for transmitting the discovery RS using the determined resources.

29. The apparatus of claim 28, wherein the configuration is transmitted in a broadcast message.

30. The apparatus of claim 28, further comprising means for transmitting an indication of transmit power corresponding to the transmitted discovery RS, allowing the UE to estimate path loss based on the discovery RS.

31. The apparatus of claim 28, wherein the transmission points involved in CoMP operations comprise transmission points of different power classes.

32. The apparatus of claim 31, wherein antenna ports of transmission points of a same power class are mapped to a common resource.

33. An apparatus for wireless communications by a user equipment (UE), comprising:
at least one processor configured to:
receive a configuration indicating distinct resources used by each of a plurality of different transmission points involved in coordinated multipoint (CoMP) operations with the UE for transmitting distinct discovery reference signals (RSs), wherein:
the distinct discovery RS for each transmission point is transmitted on resources also used for channel state information reference signals (CSI-RS),
CSI-RS resources used for transmitting distinct discovery RS from transmission points of different power classes are mapped to different frequency and time positions, and
resources used for discovery RS have at least one of denser frequency tone allocation or denser time allocation than resources used for CSI-RS;
receive the distinct RSs transmitted from the plurality of different transmission points on the distinct resources; and
calculate at least one of path loss or reference signal received power (RSRP) estimations for each of the transmission points based on the distinct discovery RSs; and
a memory coupled with the at least one processor.

34. An apparatus for wireless communication by a transmission point, comprising:
at least one processor configured to:
determine resources for transmitting a discovery reference signal (RS) for discovery by a user equipment (UE), the determined resources being distinct from resources used for transmitting discovery RS by one or more other transmission points involved in coordinated multipoint (CoMP) operations with the UE, wherein:
the distinct discovery RS for each transmission point is transmitted on resources also used for channel state information reference signals (CSI-RS),
CSI-RS resources used for transmitting distinct discovery RS from transmission points of different power classes are mapped to different frequency and time positions, and
resources used for discovery RS have at least one of denser frequency tone allocation or denser time allocation than resources used for CSI-RS;
transmit a configuration indicating the determined resources used by each transmission point; and
transmit the discovery RS using the determined resources; and
a memory coupled with the at least one processor.

35. A non-transitory computer readable medium having instructions stored thereon, the instructions executable by one or more processors for:
receiving a configuration indicating distinct resources used by each of a plurality of different transmission points involved in coordinated multipoint (CoMP) operations with the UE for transmitting distinct discovery reference signals (RSs), wherein:
the distinct discovery RS for each transmission point is transmitted on resources also used for channel state information reference signals (CSI-RS),
CSI-RS resources used for transmitting distinct discovery RS from transmission points of different power classes are mapped to different frequency and time positions, and
resources used for discovery RS have at least one of denser frequency tone allocation or denser time allocation than resources used for CSI-RS;
receiving the distinct discovery RSs transmitted from the plurality of different transmission points on the distinct resources; and
calculating at least one of path loss or reference signal received power (RSRP) estimations for each of the transmission points based on the distinct discovery RSs.

36. A non-transitory computer readable medium having instructions stored thereon, the instructions executable by one or more processors for:
determining resources for transmitting a discovery reference signal (RS) for discovery by a user equipment (UE), the determined resources being distinct from resources used for transmitting discovery RS by one or more other transmission points involved in coordinated multipoint (CoMP) operations with the UE, wherein:
the distinct discovery RS for each transmission point is transmitted on resources also used for channel state information reference signals (CSI-RS),
CSI-RS resources used for transmitting distinct discovery RS from transmission points of different power classes are mapped to different frequency and time positions, and
resources used for discovery RS have at least one of denser frequency tone allocation or denser time allocation than resources used for CSI-RS;
transmitting a configuration indicating the determined resources used by each transmission point; and
transmitting the discovery RS using the determined resources.

\* \* \* \* \*